United States Patent

[11] 3,634,734

[72] Inventor Junius D. Scott
  Homer City, Pa.
[21] Appl. No. 842,315
[22] Filed July 16, 1969
[45] Patented Jan. 11, 1972
[73] Assignee FMC Corporation
  San Jose, Calif.

[54] SCR CONTROL FOR INDUCTIVE POWER CIRCUIT
  9 Claims, 2 Drawing Figs.

[52] U.S. Cl. .................................... 317/148.5,
  323/22
[51] Int. Cl. .................................... H01h 47/32
[50] Field of Search .......................... 317/148,
  49, 148.5; 321/5, 18; 323/22, 66, 34, 35, 36

[56] References Cited
  UNITED STATES PATENTS

| | | | |
|---|---|---|---|
| 2,998,547 | 8/1961 | Berman | 323/22 |
| 3,265,955 | 8/1966 | Brown | 323/22 |
| 3,333,178 | 7/1967 | Van Allen et al. | 323/22 X |
| 3,374,423 | 3/1968 | Hemmenway | 323/22 |
| 3,176,215 | 3/1965 | Kusko | 323/22 X |
| 3,193,725 | 7/1965 | Skirpan | 323/22 X |
| 3,504,270 | 3/1970 | Harada | 323/34 X |

OTHER REFERENCES

J. G. Linvill and J. F. Gibbons Transitors and Active Circuits 1961, McGraw-Hill Book Company, Inc., pages 463–465.

Primary Examiner—Lewis H. Myers
Assistant Examiner—Ulysses Weldon
Attorneys—F. W. Anderson and C. E. Tripp ABSTRACT: A control switch circuit for providing gate pulses to an SCR switch in an AC power circuit which circuit includes a variable inductive load. The control circuit includes a magnetic amplifier with one control winding energized by a fixed reference voltage or by a variable control signal and with a second, oppositely wound control winding energized through a feedback circuit the input of which is provided by a current transformer connection to the power circuit. The output of the magnetic amplifier is a series of pulses which are connected to the gate of the SCR and which are shaped so as to provide a steep, high-voltage leading edge for precise timing and for saturation of the gate junction of the SCR in a minimum time period.

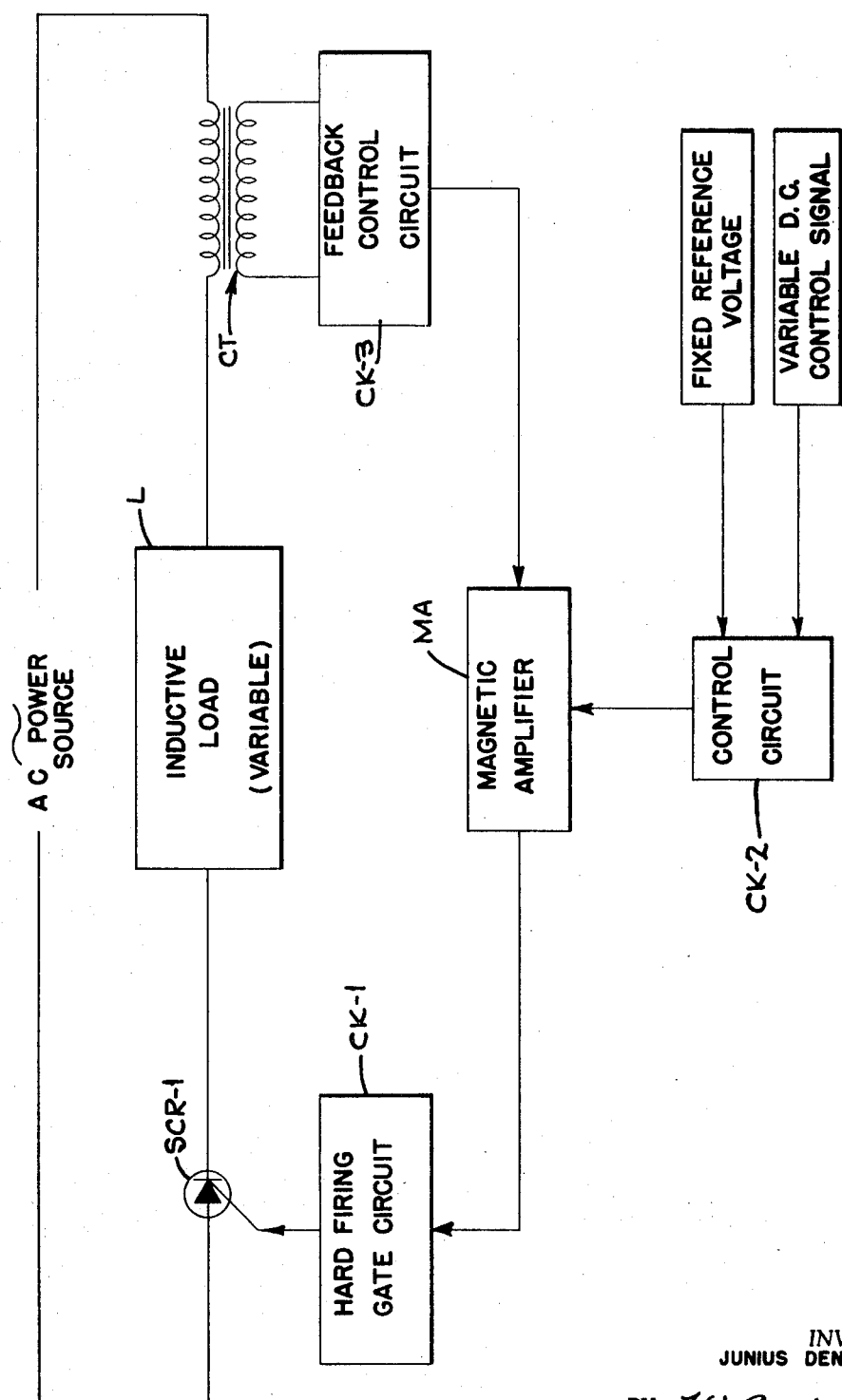
FIG_1

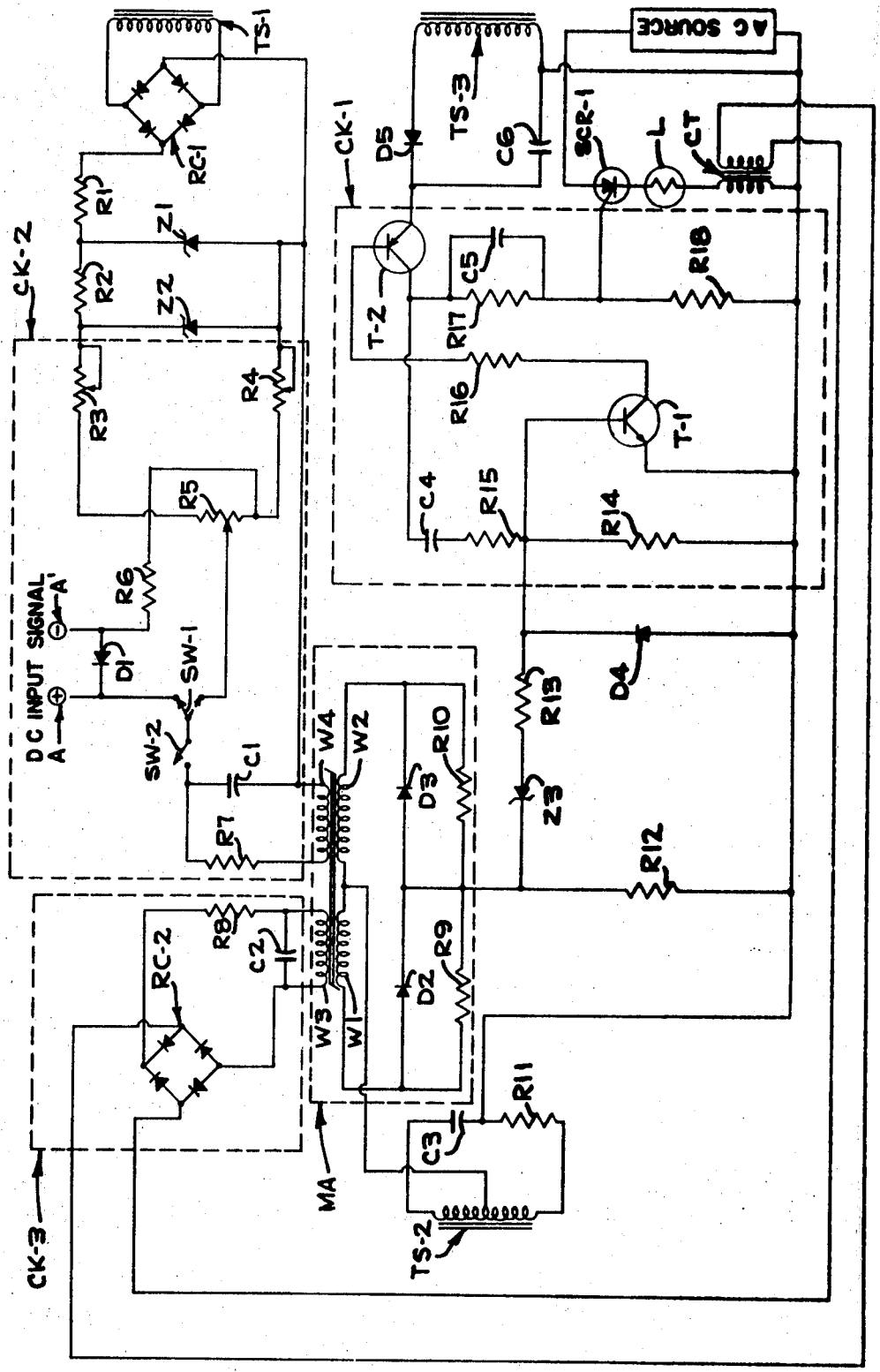
FIG_2

SCR CONTROL FOR INDUCTIVE POWER CIRCUIT

BACKGROUND OF THE INVENTION

1. Field of the Invention

The present invention pertains to Semiconductor controlled rectifier switches for inductive power circuits, and more particularly, it pertains to SCR-gate triggering or firing circuits for providing timed pulses at the gate of a power SCR.

2. Description of the Prior Art

Since the advent of semiconductor control rectifiers, more particularly silicon-controlled rectifiers, for switching a predetermined portion of an AC power cycle to a load, many different approaches to the trigger or firing circuit for the rectifier have been provided, and most of these have evolved from the basic firing circuits for the thyratron tubes which formerly handled the switching function in an AC power circuit. Despite the proliferation of SCR-gate triggering circuits in recent years accompanying the rapid expansion in the types and uses of SCRs, most of the present control circuits do not provide a linear control for the power output particularly when the SCR is driving a heavily inductive load such as, for example, the operating coil of an electromagnet. When linearity is provided it has been found necessary to include complex and expensive circuit components which have made such control circuits uneconomical.

Another problem with most of the present circuits for firing a power SCR is that they have no means for compensating for variations in the AC source voltage. These unwanted fluctuations may cause damage in the load; for example, when the load is the operating coil of an electromagnetic feeder, a sudden power surge of current at the terminals of the coil could cause the pole faces of the armature and core to strike with resultant damage to the structure of both the electromagnet drive and the feeder. If the armature and core of the electromagnetically driven feeder are set far enough apart to accommodate a nominal amount of surge or transient voltage, the efficiency of the feeder is reduced since a higher average coil current will be required to drive it. Consequently, such loads require fine control of the supply voltage, and the SCR triggering circuit is where such control must be provided.

In order to accommodate fluctuations in the source voltage some circuits of the prior art did provide automatic compensation in the triggering circuitry as is shown by the U.S. Pat. disclosure of Scott No. 3,188,528, for example. It is to be noted that the compensating means of the Scott patent includes a shunt circuit for the load which draws power from the load and which would not give the same degree of control for different loads since the magnitude of the feedback or control signal would be dependent upon the characteristics of the load.

The saturable reactor, and particularly the magnetic amplifier as disclosed in the aforementioned prior patent to Scott, is well adapted to provide triggering pulses for an SCR since the circuitry can be isolated from the load and since protection against SCR misfiring by line transients is assured due to the integrating function performed by the gate windings of the magnetic amplifier. Consequently, magnetic amplifier firing circuits have been popular in recent years for providing SCR triggering pulses with the U.S. Pats. to Hemmenway No. 3,374,423 and Gutterman No. 3,386,026 being two examples of such circuits. Magnetic amplifiers are also desirable as triggering circuit components in that they are well adapted to accept external signals or combinations of signals for controlling power to the load since such signals can be accommodated directly by one or several control windings on the magnetic amplifier.

Despite the acceptability of magnetic amplifier triggering circuits for SCRs, many problems remain especially the ability to achieve a linear output over the full range or maximum conduction angle of 180° of the SCR. Also, there are significant problems in achieving a "hard firing" circuit or one with an extremely short rise time on the triggering pulse which feature is particularly important in power circuits where the magnitude of the current carried by the SCR is great and where breakdown and failure would soon occur if the gate junction were not completely turned-on prior to the passage of anode-to-cathode current. Furthermore, these problems may be increased or additional problems presented when an inductive load is present in the power circuit due to the generation of induced currents and the inherent current lag of the applied voltage. The last factor, for example, requires special pulse shaping components in the triggering circuitry in order to prevent the gating pulse from dying out before the SCR anode current builds up above the holding current value, i.e., the current necessary to sustain regeneration within the SCR and therefore maintain it in a conducting state irrespective of the gate voltage.

SUMMARY OF THE INVENTION

By the present invention, a semiconductor-controlled rectifier power switching circuit is provided for feeding AC power to an inductive load whereby voltage variations and transients in the AC power source are automatically compensated for in the SCR triggering circuit so that the power to the load will be maintained constant. Furthermore, the triggering circuit for the semiconductor-controlled rectifier is such that a continuous external signal can be utilized to alter the power to the load in accordance with selected external conditions, and a unique feedback circuit is provided so that the load current is also continuously monitored with the information being used in the control of the triggering circuit.

A magnetic amplifier is used as the basic control element of the triggering circuit with the output of the amplifier providing pulses for the gate of a semiconductor-controlled rectifier which is in series with the load. A current-sensing means in the power circuit directly senses the current through the load and provides a DC feedback signal to one of the control windings of the magnetic amplifier. An oppositely wound control winding of the amplifier is utilized and is provided with either a fixed reference voltage or with a variable input signal and, consequently, the differential signal produced by the combination of the control windings determines the reset point of the core elements of the magnetic amplifier and thereby determines the timing of the pulses delivered to the gate of the controlled rectifier.

A special feature of the present invention is the fact that the control circuit is provided with means for insuring a "soft start." As is well known, such a type of circuit provides that sharp increases in current to the load will not be applied suddenly so that damage can result. As pointed out previously, this is particularly important where the load may be an electromagnetically driven feeder.

Another feature of the present invention is the provision of a special hard firing gate circuit which will both shape the pulsed output of the magnetic amplifier and provide a high-voltage, steep spike at the leading edge of each pulse so that the gate junction of the semiconductor-controlled rectifier will be saturated in a minimum period of time in order to prevent damage to the structure of the SCR.

A further feature of the present invention is the ability of the firing circuitry to provide for an SCR maximum conduction angle of 180° of the applied AC voltage and yet maintain a linear relationship throughout the operating range between the applied signal current and the load response. This feature is partially achieved by a special phase-shifting circuit which permits operation of the magnetic amplifier within its linear control region.

BRIEF DESCRIPTION OF THE DRAWINGS

FIG. 1 is a block diagram representation of the functional components of the circuitry of the present invention.

FIG. 2 is a schematic diagram of the circuitry of the present invention.

DESCRIPTION OF THE PREFERRED EMBODIMENT

Referring now more particularly to the drawings, FIG. 1 shows by means of block diagrams the arrangement of the functional components of the circuitry of the present invention. It will be seen that the power circuit comprises a power silicon controlled rectifier SCR-1 which is of conventional construction and which operates as a switching device to permit a controlled fraction of each positive-moving half cycle of the AC power source to be delivered to a load L. The circuitry of the present invention is specifically designed to control the current delivered to a load of the inductive type, particularly a load wherein the inductive reactance is subject to variation throughout the operating cycle. Such a load may comprise the operating coil of an electromagnet such as might be used to drive a vibratory feeding device, apparatus of this type being shown in the U.S. Pat. to Weyandt No. 2,662,192 for example.

As is conventional in SCR-controlled power circuits, the SCR is switched on by the pulses output of a gate circuit CK-1 which provides a train of pulses to the gate of the SCR the leading edges of which determine the point in time at which the SCR is fired and thereby the magnitude of the power delivered to the load. The gate circuit in the present invention is one which permits hard firing, i.e., one wherein the pulses have a steep leading edge and a high instantaneous voltage or spike so that the gate-cathode junction of the SCR is saturated in a minimum period of time. This insures precise timing so that the current delivered to the load will be uniform and, furthermore, it insures that damage to the SCR from the relatively large load current will be prevented. The pulses delivered at the SCR gate have a duration such that the SCR gate remains turned on for a period of time to insure build up of the anode current through the SCR to a value exceeding the holding current; this is particularly important in a circuit with a large inductive load since the current through the SCR may have an initial lag due to the inductive reactance in the circuit.

The pulses for the gate circuit are provided by a magnetic amplifier MA of conventional construction which is provided with a pair of oppositely wound control windings. One control winding is energized from a control circuit CK-2 the inputs of which are provided selectively from a fixed reference voltage or from a variable DC control signal. The other control winding is energized by a feedback control circuit CK-3 the input of which is derived from a current transformer tap CT in the power circuit. The differential control signal or error signal produced by the summation of the two control windings determines the point in the AC cycle at which the core elements of the magnetic amplifier saturate and thereby determines the timing of the pulses from the magnetic amplifier.

It can be seen that fluctuations in the AC source voltage will be detected by the feedback control circuit CK-3 as they affect the load and that the pulse output from the magnetic amplifier will be varied so as to increase or decrease the power to the load accordingly. Other variations in the power being drawn by the load due to various external factors will similarly be detected by the current-sensing means CT and the feedback control circuit will accordingly modify the output pulses so that a uniform operation of the load is achieved.

It will also be recognized that only the positive one-half of the AC input voltage can be supplied to the load since the power SCR will block the negative half-cycle. The pulse-forming circuitry of the present invention is therefore designed to produce only one pulse for each full AC cycle which pulse will be initiated during the positive-moving portion of the cycle, i.e., when the anode of SCR-1 is positive with respect to the cathode.

The magnetic amplifier MA, as shown in FIG. 2, comprises a double core device with serially connected gate or loading windings W1 and W2 arranged on the cores and with the control windings W3 and W4 interconnecting the cores. A supply voltage is provided by a transformer secondary TS-2 which voltage is derived from the AC power source. By means of a center tap connection this voltage is provided upon the gate windings W1 and W2 through a connection between the windings. On the positive half-cycle therefore, current is directed through the winding W1 and a diode D2 to a load resistor R12, and on the negative half-cycle current is directed from the load resistor R12 through a diode D3 and the gate winding W2 back to the transformer. As is well known, when the core elements of the magnetic amplifier are unsaturated with magnetic flux created by the electric current, the gate windings have a very high inductive reactance and provide a high-impedance path for the current. However, when the core about which the gate current is passing is saturated with magnetic flux, the reactance of the winding is in effect shorted out and a sharply increased current will be permitted to flow limited only by the magnitude of the load resistor R12. Since the core elements (in a properly designed magnetic amplifier) change state abruptly from an unsaturated condition to a saturated condition as a flux builds up therein, the switching action of the magnetic amplifier is achieved. That is to say, a short rise time is provided on the current pulse generated across the load resistor R12. The voltage as seen by the resistor R12 will therefore resemble a sine wave in which each half-cycle has been abruptly switched on from zero volts to some positive (or negative) voltage at some predetermined point.

The point or conduction angle at which the core elements of the magnetic amplifier saturate is determined by the reset bias provided by bias resistors R9 and R10 and by the effect of the oppositely would control windings W3 and W4. The bias resistors R9 and R10 are placed in parallel with the diodes D2 and D3, respectively, to provide a reduced amount of current to the gate windings W1 and W2 during that portion of the AC cycle when the gate windings are blocked by the diodes in order to decrease the flux in the core elements and reset them for the subsequent half-cycle. The ensuing positive half-cycle will result in a predetermined period of flux build up in one of the core elements until saturation, which period of time is determined by the magnitude of the associated reset resistor. The control windings, which are wound about both the cores, directly affect the amount of reset of the core elements in accordance with the net DC current through the control windings. Thus, the magnitude of the DC current determines in a linear fashion the resetting effect of the gate windings in the reset mode, i.e., when they are supplied with current by the bias resistors R9 R10. As has previously been explained control windings W3 and W4 are oppositely wound so that they tend to cancel each other. The differential control signal or error signal produced by the combination of these two control windings therefore provides the means for shifting the reset point to determine the firing point of the SCR.

The DC current for control winding W4 is provided by the control circuit CK-2 which may alternatively accept a predetermined fixed voltage input or a variable DC input signal. As shown in FIG. 2, the fixed reference voltage is derived from the terminals of a transformer secondary TS-1 to which a full-wave rectifier RC-1 is connected. Zener diodes Z1 and Z2 and current-limiting resistors R1 and R2 are utilized to regulate the output of the full-wave rectifier to a predetermined peak value. This varying DC voltage is applied to the control circuit CK-2 through a pair of variable resistors or rheostats R3 and R4 and through the body of a potentiometer R5. The variable resistors R3 and R4 permit the applied voltage to be adjusted to a predetermined maximum and minimum value, respectively. The slider on the potentiometer R5 picks off the selected voltage and connects it through selector switch SW-1 (in the dashed line position of FIG. 2) and On-Off switch SW-2 to the control winding W4. Resistor R7 and capacitor C1 filter the varying DC voltage so that a smooth DC level appears at the output upon the control winding W4.

It will be noted that the capacitor C1 provides the only filtering means for the DC voltage derived from the fixed input source and that this capacitor is in series with the resistor R7 and the control winding W4. When the On-Off switch SW-2 is switched to the on position to close the control circuitry, and when the operational switch SW-1 is placed in the dashed line position shown in FIG. 2 to provide control winding W4 with the preselected voltage from the potentiometer R5, the capacitor C2 will be charged as current flows to the control winding and will thereby serve an important purpose in providing a controlled rate of rise in the voltage across the control winding W4 during the initiation of power to the control circuitry. A so called "soft start" application of the power to the load is thereby achieved, and this feature is particularly desirable in order to prevent damage to certain loads as has already been pointed out.

A variable DC input can also be provided upon the control winding W4 by moving the selector switch SW-1 to the full line position shown in FIG. 2. This will connect the input terminals A and A' and a current-limiting resistor R6 to the control winding while cutting out the fixed reference voltage. A portion of the minimum set rheostat R4 is also included in the input circuitry and may be used for scaling purposes to adjust the input from terminals A and A' to the remainder of the circuitry. A diode D1 is connected across the input terminals to prevent any voltage developed across the minimum set rheostat R4 from being directed to the DC input circuitry. The integrating capacitor C1 functions to provide a soft start when the DC control signal is switched in as with the fixed reference voltage, and further serves to prevent any sudden increases in the external signal from having an adverse effect upon the load. A typical example of an input signal which might be used in an application of the power circuitry of the present invention is one where the input signal is derived from a device which is driven or supplied by the load device. For example, where the load is an electromagnetically driven vibratory feeder which is feeding material to certain processing apparatus, conditions at the processing apparatus may dictate an increase or decrease in the output of the feeder. A simple DC signal produced by conventional methods at the processing apparatus will then directly affect the power delivered to the feeder and hence the output of the feeder.

The second control winding W3 derives its input from the feedback circuit CK-3 which receives an input from the current transformer tap CT in the power circuit. Although the power circuit includes only a varying DC voltage, the output of the current transformer will be AC due to the induced voltage in the transformer secondary. This AC current, which is proportional to the load current, is rectified by a full-wave rectifier RC-2, is filtered by the resistor R8 and capacitor C2 combination, and is applied at the terminals of control winding W3. While the effect of the control windings W3 and W4 is to cancel each other, during equilibrium operating conditions the net result should be a positive DC voltage upon the winding W4 which will tend to inhibit the action of the reset current so that the saturation point will be reached at an earlier point in the voltage cycle through the gate windings.

In order to provide for a maximum conduction angle of 180° by SCR-1, SCR-1 must be switched on at precisely the start of the positive half-cycle of the AC power supply. This is not possible if the supply voltage for the magnetic amplifier is in phase with the AC power supply since some reset of the core elements must be provided if the magnetic amplifier is to be operated in a linear fashion. The magnetic amplifier supply voltage from TS-2 is therefore phase shifted so that it leads the AC power supply by some angle of less than 90° and preferably about 30°. This is accomplished by connecting the opposite ends of TS-2 to a capacitor C3 and a resistor R11 the values of which are chosen so as to cause the voltage at the point between R11 and C3 to lag the voltage at the center tap of TS-2 by approximately 150°. This voltage is then inverted when applied to the gate windings of the magnetic amplifier so that the net effect is to apply a voltage to the gate windings which leads the power supply by approximately 30°. This permits the magnetic amplifier to operate in its linear region to create a positive switching action since at least 30 electrical degrees of flux buildup in the core is provided before a firing pulse will be necessary.

Since the magnetic amplifier is not a perfect switch in that some amount of current will pass through each gate winding in the unsaturated state, a small voltage will appear across the resistor R12 prior to saturation of the associated core element. This small voltage, in the order of one or two volts, is removed by a zener diode Z3 before the pulsed output of the magnetic amplifier is applied to the gating circuit CK-1.

Resistors R13 and R14 form a voltage dividing network with the voltage across resistor R14 being applied between the base and emitter of a transistor T-1 in the gating circuit CK-1. A blocking diode D4 in the input to the gating circuit serves to remove the negative half-cycles of voltage so that only the positive half-cycles are applied to the transistor T-1. The transistor T-1 therefore serves as a DC switch which is turned on by the leading edge of the pulse which appears across resistor R14. The output or collector junction of transistor T-1 is connected through a current-limiting resistor R16 to the base of a second transistor T-2. Thus, when the transistor T-1 has turned on, the transistor T-2 is also turned on to cause a voltage to appear in the collector circuit of T-2 across the resistors R17 and R18. The voltage across the load resistor R18 is applied between the gate and the cathode of SCR-1 and provides the firing pulse therefor.

A special feature of the gating circuit is the positive feedback provided between the transistor T-2 and the transistor T-1 by the capacitor C4 and the current-limiting resistor R15 which are serially connected between the base of transistor T-1 and the collector or output of transistor T-2. When T-1 is turned on and the current in the collector circuit through R16 increases, T-2 will be turned on to provide a voltage upon capacitor C4. This capacitor, which is connected to the base of transistor T-1, serves to further increase the current to the input of T-1 which, in turn, increases the output of T-1 which, in turn, increases the output of T-2. An avalanche effect is thereby created which quickly drives both transistors T-1 and T-2 into saturation, and a voltage pulse is created in the output circuit across resistor R18 with a relatively steep leading edge. The voltage supply for the transistors is provided by a transformer secondary TS-3 with the rectifying and filtering provided by the diode D5 and the capacitor C6.

Before a pulse is applied across the terminals of the resistors R18 it passes through the parallel combination of a resistor R17 and a capacitor C5. The capacitor C5 creates the "hard firing" condition by permitting a very steep high-voltage spike to be generated instantaneously at the initiation of the pulse so that the gate-cathode junction will be saturated before any appreciable anode current can flow in the SCR. The resistor R17 then limits the current which will flow to the gate during the duration of the pulse so that the gate junction is not made to carry the high voltage over any appreciable period of time.

A further feature of the present invention is supplied by the transistor circuitry in the gate circuit CK-1 which provides a squaring action upon the pulse from the magnetic amplifier whereby the pulse is maintained at a firing level for a sufficient period of time so that the current through SCR-1, even in a heavily inductive circuit, can build up above the latching or holding current value to thereby maintain SCR-1 in a conducting state throughout the positive half-cycle of applied AC voltage.

From the foregoing discussion it will be seen that the circuitry of the present invention is particularly well adapted to control the delivery of power to an inductive load and to provide precise regulation of the power delivered to the load in a manner whereby both the power semiconductor-controlled rectifier and the load itself are protected from damage. Furthermore, it will be appreciated that the circuitry of the present invention can be economically produced and requires no large and costly components.

Although the best mode contemplated for carrying out the present invention has been herein shown and described, it will be apparent that modification and variation may be made without departing from what is regarded to be the subject matter of the invention.

What is claimed is:

1. A gate-triggering circuit for a semiconductor-controlled rectifier which is connected between an AC power source and an inductive DC load such as an electromagnetic feeder coil and which is adapted to switch to said load a predetermined portion of each positive half-cycle of applied AC power and to block from said load each negative half-cycle of applied AC power, said triggering circuit comprising a magnetic amplifier having first and second oppositely wound control windings for controlling the amount of reset of the magnetic core of the amplifier, said magnetic amplifier having its output connected to the gate of said controlled rectifier for applying triggering pulses thereto, means for sensing the magnitude of the DC current to said load, a feedback circuit for filtering the output of said current-sensing means and directing a DC feedback signal to the first control winding of said magnetic amplifier which is proportional to the magnitude of the load current, a control circuit for applying an external DC signal to the second control winding of said magnetic amplifier whereby the timing of said pulses from said amplifier is determined by the magnitude of the differential control signal provided by the combination of said first and second control windings, a pulse-shaping circuit comprising a two-stage DC transistor amplifier with the output of the second stage being connected to said gate and with the input of the first stage being connected to the output of said magnetic amplifier, and a capacitor arranged between the output of said second stage and the input of the first stage of said DC amplifier for providing positive feedback whereby the transistors are rapidly driven into saturation upon the reception of an input pulse from said magnetic amplifier to thereby provide a squared pulse output to said gate.

2. A gate-triggering circuit for a semiconductor-controlled rectifier as set forth in claim 1 including a second capacitor and a resistor arranged in parallel and connected between said gate and the output of said second stage of said DC amplifier.

3. A power circuit for driving an inductive DC load such as an electromagnetic feeder coil from an AC power source comprising a semiconductor-controlled rectifier connected in series with said load for delivering a predetermined fraction of each positive half-cycle of applied power to said load and for blocking each negative half-cycle of applied power to said load, a magnetic amplifier driven from said power source and connected so as to supply gate triggering pulses to said controlled rectifier, a current transformer tap connected in series with said load and having an output which is proportional to the magnitude of the DC current to the load, a feedback circuit for rectifying the output of said current transformer and applying it to a first control winding on said magnetic amplifier, a second control winding of said magnetic amplifier being oppositely wound from said first control winding, a control circuit for applying an external DC signal to said second control winding whereby the timing of said pulses from said amplifier is determined by the magnitude of the differential control signal provided by the combination of said first and second control windings, a pulse shaping circuit comprising a two-stage DC transistor amplifier having the input to the first stage connected to the output of said magnetic amplifier and the output of the second stage connected to the gate of said controlled rectifier, and positive feedback means connecting the output of said second stage with the input of said first stage for providing a squared pulse to said gate.

4. A power circuit as set forth in claim 3 including a parallel combination of a capacitor and a resistor serially connected between said gate and said output of said second stage of said DC amplifier for providing each pulse with a high-voltage steep leading edge.

5. A power circuit as set forth in claim 3 wherein the gate windings of said magnetic amplifier are provided with an AC voltage from said AC power source, and means for phase shifting said AC voltage input to the gate windings with respect to said AC power source so that said gate winding input leads said power source by an electrical angle of less that 90° whereby the positive half-cycles of the AC power source can be switched through said controlled rectifier for a maximum conduction angle of approximately 180°.

6. A power circuit as set forth in claim 3 wherein said control circuit for applying said external DC signal to said second control winding includes a current-limiting resistor connected in series with said second control winding and a capacitor connected in parallel with said second control winding and said resistor for the prevention of sudden increases in current to said inductive load.

7. A power circuit as set forth in claim 6, said control circuit further comprising rectifying means for receiving a fixed AC voltage and producing a variable DC output, zener diode-regulating means connected to the output of said rectifying means for fixing the peak magnitude of said variable DC voltage, and a control potentiometer connected to the output of said regulating means and across said capacitor, said potentiometer being adjustable to provide a predetermined magnitude of said variable DC voltage to said capacitor.

8. A power circuit as set forth in claim 6 wherein said control circuit is provided with input terminals connected across said capacitor for receiving a continuously variable external DC signal.

9. A gate-triggering circuit for a semiconductor-controlled rectifier which is connected between an AC power source and in inductive DC load such as an electromagnetic feeder coil and which is adapted to switch to said load a predetermined portion of each positive half-cycle of applied AC power and to block from aid load each negative half-cycle of applied AC power, said triggering circuit comprising a magnetic amplifier having first and second oppositely wound control windings for controlling the amount of reset of the magnetic core of the amplifier, said magnetic amplifier having its output connected to the gate of said controlled rectifier for applying triggering pulses thereto, means for sensing the magnitude of the DC current to said load, a feedback circuit for filtering the output of said current-sensing means and directing a DC feedback signal to the first control winding of said magnetic amplifier which is proportional to the magnitude of the load current, a control circuit for applying an external DC signal to the second control winding of said magnetic amplifier whereby the timing of said pulses from said amplifier is determined by the magnitude of the differential control signal provided by the combination of said first and second control windings, said gate windings of said magnetic amplifier being provided with an AC voltage from said AC power source, and means for phase shifting the AC voltage input to the gate windings of said magnetic amplifier with respect to said AC power source so that said gate winding input leads said power source by an angle of less than 90° whereby the positive half-cycles of the AC power source can be switched through said controlled rectifier for a maximum conduction angle of approximately 180°.

* * * * *